Feb. 21, 1967 C. S. SLAUGHTER 3,305,055
FLUID PARTICLE COUPLING
Filed Aug. 21, 1964 2 Sheets-Sheet 1

INVENTOR.
CLARENCE S. SLAUGHTER
BY
Miller Morris & Pappas
ATTORNEYS

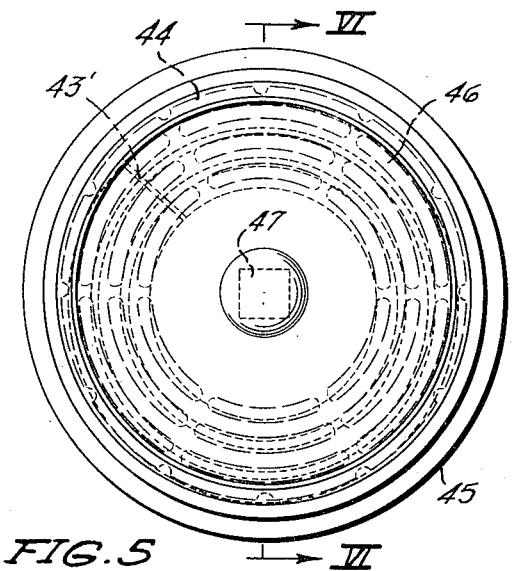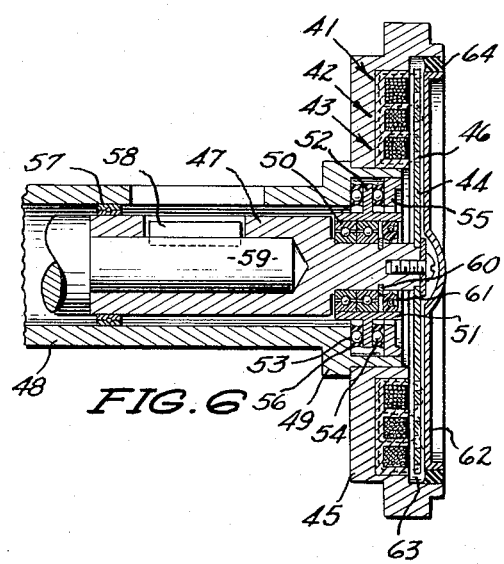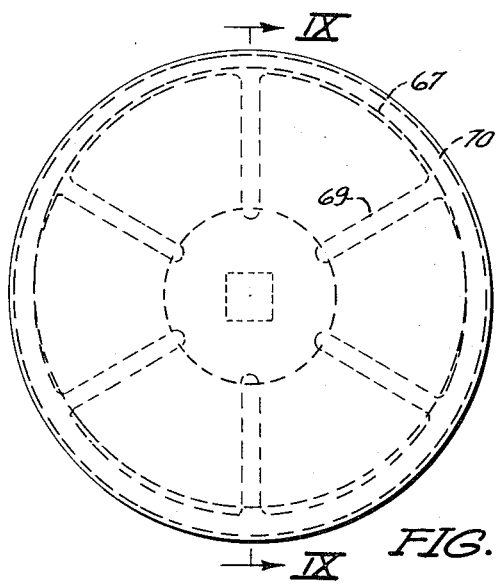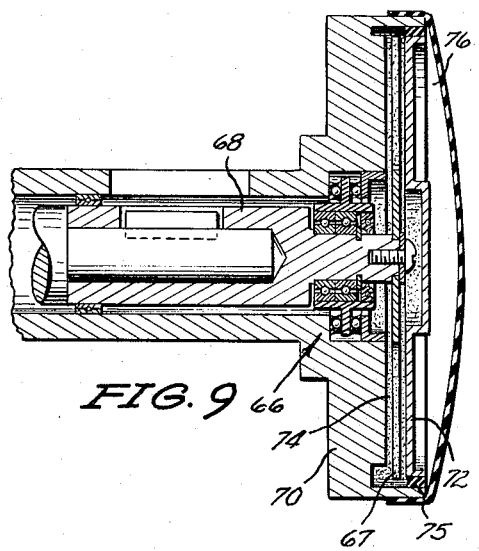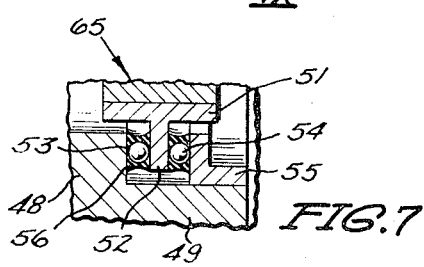

United States Patent Office 3,305,055
Patented Feb. 21, 1967

3,305,055
FLUID PARTICLE COUPLING
Clarence S. Slaughter, 750 Oakdale SE.,
Grand Rapids, Mich. 49507
Filed Aug. 21, 1964, Ser. No. 391,113
4 Claims. (Cl. 192—21.5)

The present invention relates to a new and improved fluid particle coupling and more particularly to a dry powder brake or clutch structure having unusual compactness, good torque carrying capabilities and notable for very small torque decay.

In modern electronic tape equipment, for example, fast acting and easily controlled clutches and brakes are necessary. Such couplings must be capable of achieving braking and/or coupling in minimum time intervals of 10 to 12 milliseconds. Devices in accord with the present invention possess such capabilities and are amazingly simple to construct. The coupling units are also extremely compact. Magnetically energized forms of the present invention involve very simple control.

Mechanical and magnetic particle coupling devices are not new and examples of the closest known structures to applicant in the art at the time of writing are represented in the United States Letters Patent: 3,026,978, 2,996,162, 2,924,315, 2,903,110, 2,832,449, 2,815,106, 2,804,955, 2,772,761, 2,654,454, 2,629,471 and 2,417,850.

The principle underlying the present invention is the use of a dry fluid in powder form and altering the viscosity of this fluid by external means for friction gripping of a low inertia disc. Coupling and breakaway characteristics are far more efficient with the dry and slightly abrasive powder than with compounds including lubricant additives used in the prior art.

The principle of the present invention is relatively simple and, in the preferred embodiment, involves the fact that particles which are influenced by a magnetic field can be changed in fluid viscosity by subjecting the magnetic particles to a magnetic force. The discrete particles are in selected sizes smaller than 200 mesh and extend into the micron range so that they may be viewed as a fluid having a specific viscosity. When this material is placed in a cavity and a simple disc is rotated in the cavity, a residual drag occurs by the fluid contact on the disc and on certain of the adjacent housing surfaces. When the particles are subjected to a magnetic field on one side or face of the disc, the viscosity of the particulated material is instantaneously altered as sintering or compaction occurs and, viewed as a brake, the disc is stopped as the magnetic powder packs between disc and housing. Release of the magnetic field unlocks the disc and the drive of the disc can be restored. The particulated material returns to a cloud form in the cavity until reenergization of the magnet.

Accordingly, the basic connection is very simple and avoids the complexities thought necessary in prior art structures. Fixed magnetic coils are possible and dimensional criticality of parts is so reduced that stampings are satisfactory for both case and disc. The magnetic particle material may include abrasive materials such as silicon carbide and glazing of the disc is thereby substantially eliminated. The avoidance of glazing of the disc results in better and more efficient repetitive use of the magnetic flux. The design also admits of off-center mounting of the coil thereby considerably extending the life of the disc by an increase in wear surface in an eccentric manner without reduction in brake or clutch efficiency. The off-center positioning of the coil assists in providing a pumping action on the powder thereby assisting in the dissipation of heat and in the circulation of the powder cloud. Where the magnet might be located radially and peripherally of the disc this is particularly helpful in facilitating breakaway.

While the invention contemplates that the devices described herein find principal usage with the influence of a magnetic field upon viscosity, it will also be appreciated that pressure influence, for example, may also cause a satisfactory change in fluid viscosity so that pneumatic hydraulic, and mechanical actuation of clutch or brake mechanisms are operative within the spirit of the present invention. In such instances, internal friction of a particulate mass is influenced by pressure or compaction or sintering thereby influencing a disc which is running in a fluid filled cavity to lock up or run dependent upon the viscosity imposed upon the fluid particles by reduction in cavity volume.

The present invention thus has as its principal object the providing of a new and improved coupling.

Another object is to provide a highly efficient coupling using a particulate fluid material and subjecting the fluid to forces causing viscosity change.

Another object is to provide a dry particle coupling structure wherein the slightly abrasive powder mixture is acted upon as a fluidized bed for excellent breakaway characteristics.

Still another object is to teach a simple and compact fluid coupling wherein the clutch surface is materially increased and the torque carrying quality is influenced by the gap between disc and clutch case on the plane faces of the disc.

Still another object is to provide efficient shaft sealing for powder materials and effective journaling in avoidance of end play or axial shaft motion.

Other objects including increased economy attending increased efficiency will be appreciated more fully by those skilled in the art as the description proceeds.

In the drawings:

FIGURE 5 is a top plan view of a brake or clutch in accord with the present invention and shows the eccentric arrangement of disc to case and magnets.

FIGURE 6 is a full cross section elevation view taken on line VI—VI of FIGURE 5 and indicating plural magnet banks in relation to the low inertia disc and revealing the unique suspension of the shaft and sealing.

FIGURE 7 is an enlarged cross section of suspension of the shaft journals.

FIGURE 8 is a top plan view of a modified form of the invention wherein mechanical pressures are employed to actuate the powder fluid against the low inertia disc and indicating the eccentric relation of low inertia disc to case and powder receptacle.

FIGURE 9 is a full section view of the structure shown in FIGURE 8 taken on the line IX—IX.

General description

Figure 1:
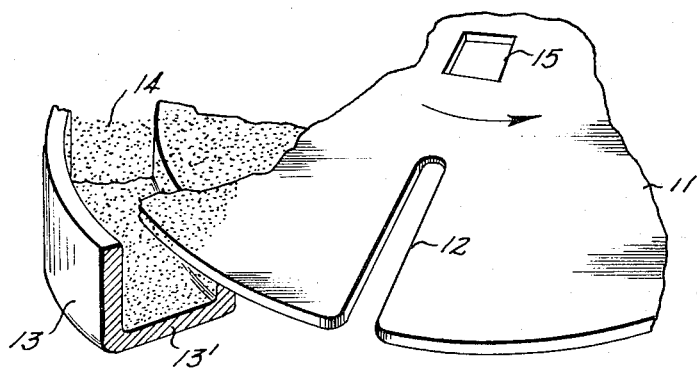
FIGURE 1 is a partial perspective view of a rotating disc moving through a dry powder fluid and with the cover removed for clarity.

In general, the present invention comprises a thin flat low inertia disc, connected, for example, to a drive member and running in a dry powder or fluid. The disc is generally circular. The disc is enclosed in a housing coaxially provided about a shaft which is secured to the center of the disc. Suitable bearings and seals are provided as between shaft and housing and the disc is spaced away from contact with the interior of the housing. An end plate closes the housing. Thus, the housing, gapped from the disc, defines a chamber or cavity which surrounds the disc. A fluid comprising solid dry particles is provided in the chamber or cavity to a level above the surface of the disc, to assure that under maximum viscosity conditions both flat surfaces of the disc are exposed to the fluid powder. The disc is slotted to allow good fluid circulation. Means are then provided for influencing the viscosity of the powder. Those means may be the application of the pressure to reduce the volume of the total cavity in which the disc runs or in the preferred embodiment is a magnetic field imposed to influence a particulated mass of magnetically influenced particles or dry powder. This imposes increased friction on the disc influencing the relative drag on the moving disc. The friction drag is accomplished on the flat surfaces of the disc by magnets having flux lines passing transversely through the flat surfaces of the disc. These may be positioned on both sides of the disc or radially of the disc at the perimeter thereof. The powder is below 200 mesh and a substantial portion of the powder is in the micron range. A small percentage of abrasive material is included in the mix. The housing and discs may comprise simple stampings and the pancake form of the clutch results in substantial economy of space. Heat is dissipated, if desired, by conventional well-known means as for example, fins extending from the housing or coolant jackets about the housing.

In the magnetic versions, the coil or magnets are locatable eccentric to the disc shaft and in parallel spaced relation to the low inertia disc thereby minimizing wear on the disc and housing by providing increased effective wear surfaces on the disc. Slight out of parallel is also beneficial to powder circulation.

An unusual journal seal is provided to avoid end play on the shaft thereby assuring proper maintenance of gap relation between disc and housing and the shaft. The seal includes a magnetic ring checking the flow of magnetic particles from carrying along shaft and into bearings in addition and as a back up to an inexpensive lip seal. The cavity behind the lip seal is preferably partially filled with molybdenum disulfide ($MoS_2$) to act as seal lubricant instead of being incorporated in powder as in prior art arrangements. In operation, the clutches and brakes in accord with this specification are fast acting and highly efficient. Particle clutches previously known in the art have been characterized for their rapid torque decay running as high as one third loss in a 24 hour running period. This decay is cumulative and in 1000 hours an additional 10 percent decay is normally observable. Since it is desired to provide a clutch having repetitive characteritsics, the prior art particle clutches have fallen substantially short of desirable life. Clutches in accord with the present invention have been repetitively subjected to 3,000,000 operational cycles at 120 inch pounds ⅓ on, ⅔ off, 2 cycles per second, 400 hours with no observable torque decay at 450 revolutions per minute. Other brakes in accord with the present invention have shown no torque decay over a period of 200 hours while operating from zero to full torque at 250 inch pounds in 10 to 12 millisecond intervals, two cycles per second.

Specific description

Figure 2:
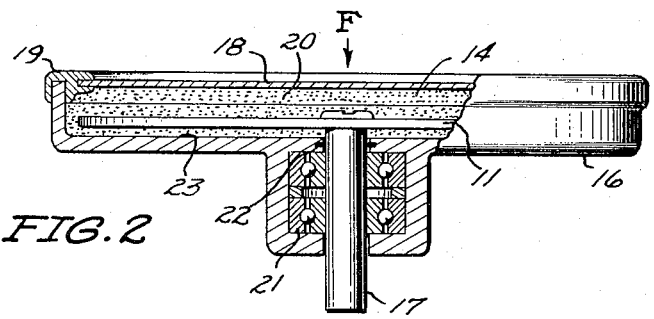
FIGURE 2 is a side elevation view partially cut away to reveal the simple disc driveably secured to a shaft and operable in a dry powder fluid contained in the body and the body closed by a cover and the cover being resiliently moveable inwardly upon external application of force F.

In the drawings and with particular reference to FIGURE 1 a thin low inertia disc 11 which is preferably slotted radially as by slots 12 is positioned to rotate in a container 13 filled loosely with a fluid powder 14 which during rotation of the disc 11 acts as a low viscosity cloud. Unlike other known particle clutch devices the powder approaches a fluidized bed condition as evidenced by the low drag on the disc 11. A channel reservoir 13' is shown in annular relation in the container 13. Rotation of the disc 11 is accomplished by axial connection of the disc 11 to a shaft, not shown, but connected to the disc 11 as by the square opening 15 to a mating shaft cross section. In the invention the viscosity of the powder 14 is altered causing frictional stoppage of the low inertia disc 11. A mechanical influence of powder viscosity is best appreciated by reference to FIGURE 2 wherein a slightly modified container 16 is shown (no channel reservoir 13') and the low inertia disc 11 is shown secured to a shaft 17 for rotation therewith. The container 16 is closed by a cover element 18 in spaced parallel relation to the disc 11. The cover 18 is resilient or capable of axial movement by reason of the resilient peripheral seal 19 when influenced by a mechanically, pneumatically or hydraulically applied force F. In the cavity 20 defined by the container 16, the cover 18 and shaft 17, is the dry powder 14 loosely encompassing the low inertia disc or rotor 11 and generally filling the container 16. The disc or rotor 11 may be relatively freely rotated in the powder milieu. The shaft 17 is adequately journalled as by bearings 21 secured in the case 16 and a simple rotary seal 22 resists the intrusion of the powder 14 into the bearing cavity. External bearing means, not shown, are preferred to control axial displacement of the shaft 17 thereby maintaining the proper space relation of the disc or rotor in the housing 16. As force F is applied the viscosity of the powder 14 increases and frictionally binds upon the surface of the disc 11 and interior surfaces of the case 16 thereby braking the movement of the low inertia disc 11. While described as a brake, it will also be appreciated that if the case 16 is not fixed it will rotate with the disc 11 when thus loaded or frictionally interlocked by the change in viscosity of the powder 20.

Figure 3:
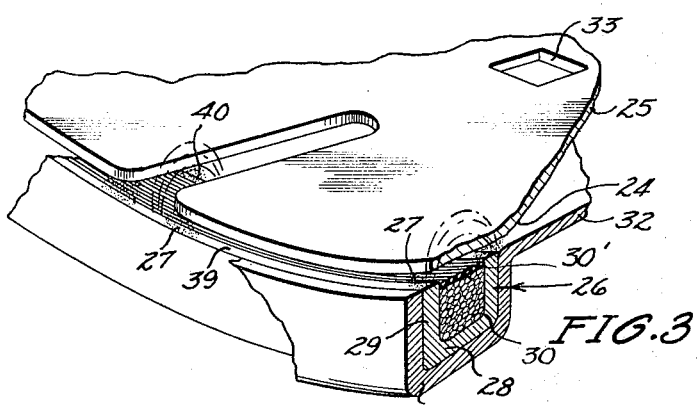
FIGURE 3 is a fragmental perspective view of a brake in accord with the present invention wherein the fluid dry powder materials are magnetically influenced by the electromagnet which is annular in shape and in spaced relation from the plane of the disc. Magnetic lines of force are shown in broken lines along with the accumulation of powder materials.

In FIGURE 3, a structure is illustrated in accord with the present invention wherein the viscosity of a dry powder is locally altered along the periphery and at the plane face 24 of a low inertia disc or rotor 25 by the influence of magnetic flux lines emanating from electromagnet 26 and passing through the rotor or disc 25. This causes the dry magnetically influenced powder 27 to pack between the poles 39 and 40 of the electromagnet 26 and the plane face 24 of the disc 25. As viscosity is increased the disc 25 is braked to a stop. The electromagnet 26 is in the form of a channel 28 with the upturned legs 29 defining a receptacle for electrical windings forming coil 30. A radial gap is provided breaking the circular channel 28 from full circle. This upgrades the magnet efficiency. As the coil is energized the lines of magnetic force bridge between the outer annular extremities of the channel legs 29, passing through the low inertia disc 25. This results in concentric annular regions of high viscosity powder concentration between the disc 25 and the spaced apart annular pole pieces thereby efficiently and effectively stopping the disc 25. The electromagnet 26 is seated in a mating channel 31 provided in the housing 32. The coil 30 is potted in a resin such as the epoxy group and covered by a scuff ring or plate 30' protecting the coil 30 against abrasion. The rotor or disc 25 is radially grooved in its preferred embodiment as shown in FIGURE 3, the radial grooves providing excellent circulating means for the powder 27 in the housing 32 when the coil 30 is deenergized. The rotor 25 is keyed to a shaft as by means of the square opening 33 in a well known manner. By reference to FIGURE 4 the brake or clutch construction expressed in FIGURE 3 can best be understood. The low inertia disc or rotor 25 is secured to the shaft 34 and the housing or case 32 provides support means for suitable bearings 35 as well as a shaft seal 36 separating the powder 27 from intrusion into the bearing area. The cavity 37 in which the disc 25 rotates is loosely filled with a magnetic powder 27 which has a relatively low viscosity and acts as a fluid when the rotor or disc 25 is in motion. The cavity 37 is closed by cover plate 38. Not shown are drive means for the shaft 34 and separate thrust bearing provisions reducing end play in the shaft to a minimum so as to maintain the spacing between the annular magnet poles and the flat circular disc 25. The simplicity of the structure and its amenability to simple stamping practice will be readily appreciated by those skilled in the art. Further, as the description proceeds it will be appreciated that the shaft 17 may be eccentrically located in respect to the axis of the housing 32 thereby increasing the wear area or friction surface utilized on the disc 25, thereby substantially extending the life of the disc 25. While described substantially as a brake it will be appreciated that the description is equally applicable to a clutch in situations in which, for example the housing is employed as a drive or driven member using either slip rings or stationary coil with low reluctance in gaps transmitting the magnetic field into the drive area.

Figure 4:
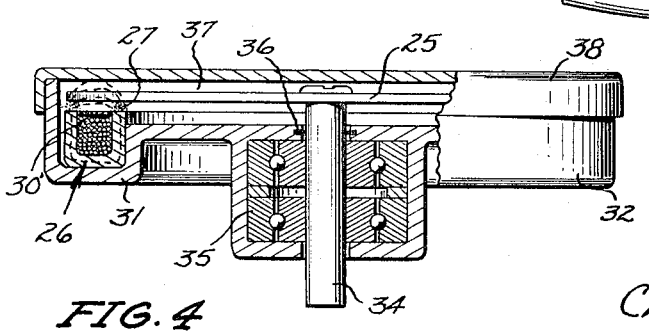
FIGURE 4 is a side elevation view of a brake in accord with the present invention revealing the case and supporting bearings, the cover and the low inertia disc and indicating electromagnetic build up of powder materials in the path of magnetic flux.

In FIGURES 5 and 6 plural annuli of electromagnets 41, 42 and 43 are used thereby increasing the power of the electromagnetic force altering the viscosity of the magnetic fluid or powder as described in reference to FIGURES 3 and 4 and amplifying the effective area of friction grip as between the low inertia disc or rotor 44 and the pole faces of the magnets. The magnet channels are radially gapped by air gap 43′ thereby upgrading the response time of the magnets 41, 42 and 43. The low inertia disc 44 is seen as eccentrically positioned in respect to the case 45 in FIGURE 5. The low inertia disc 44 is provided with curvalinear slots 46 concentric about the center of the rotor or disc 44. Radial slots are also used to advantage and combination type openings are frequently desirable in specific installations. These serve to circulate the dry magnetic powder in the case 45 as the disc 44 is rotated and the configuration reduces interference with the full effect of the flux lines when the electromagnets 41, 42 and 43 are energized. The disc 44 is keyed to the shaft 47 and rotates therewith. A tubular hub piece 48 extends from the case 45 parallel to but offset from the axis of the case 45 to provide the eccentric relationship between disc 44 and case 45. The tubular hub 45 also provides an enlarged mounting bell portion 49 for accommodating the unique journalling of the shaft 47. Radial bearings 50 are housed in a tubular sleeve 51. The tubular sleeve 51 is provided with annular skirt 52 so that in cross section the tubular sleeve appears to be T-shaped. The inner positions of the bearings 50 engage the shaft 47. Balls 53 and 54 are interposed between the inner shoulder of the bell portion 49 of the tubular hub 48 and the skirt 52 and the skirt 52 and the annular bell closure ring 55. The rings of balls are imbedded in a resilient matrix 56 such as neoprene or the like thereby sealing the tubular sleeve against passage of powder material while providing an accurate thrust control wholly eliminating end play in the shaft 47. At the same time some radial displacement is permitted by reason of the resilient matrix allowing the balls to move radially but not axially of the shaft 47. Accordingly relatively loose outboard bearings 57 may be employed but are non-critical and shaft connection to a drive member may be by loose spline or simple key 58 connecting shaft 47 to drive shaft 59. Some runout of drive member may be accommodated by this method. Snap ring 60 secures the radial bearings 50 in position on the shaft 47. The ring 60 is preferably a permanent magnet in the form of a rubber base washer impregnated with permanent magnetic material, floating in the area behind seal and providing a low flux strength trap for magnetic powder thus protecting the bearings 50. Radial seal 61 riding against the inner face of sleeve 51 and engaged against the rotating shaft 47 eliminates the intrusion of powder along the shaft 47. Since the sleeve 51 is fixed in position coaxial with the shaft 47 and radially drifts with the shaft 47 a maximum seal life is experienced.

A cover plate 62 closes the powder cavity 63 in the container or housing 45 and is sealed in position by the sealing ring 64.

In FIGURE 7 an enlarged cross section view of the tubular bearing support sleeve 51 is shown with its radial plane skirt 52 interposed between ball rings 53 and 54 in their resilient matrix 56. The tubular sleeve internally supports bearings, shaft seal, and bearing retainers generally designated as 65. The ring 55 secures the thrust-seal in position in the bell portion 49 of the hub 48. Thus radial movement of the shaft may occur but axial movement is prevented by the unique and precision arrangement of balls 53 and 54 so that seals and radial bearings float with the tubular mount 51. As will be appreciated this arrangement precisely locates the plane of the low inertia clutch or brake disc 44.

By reference to FIGURES 8 and 9 a mechanical, pneumatic or hydraulic operated clutch or brake is shown which employs journalling and sealing 66 as described in reference to the FIGURE 6 structure. The low inertia rotor or disc 67 is secured to the shaft 68 and is rotated thereby. The disc 67 is flat and circular of thin relative cross section and is provided with radial circulating slots 69. The case or housing 70 provides support for the shaft and the inner surface 71 of the housing 70 is in spaced parallel relation to the disc 67. The housing 70 is closed by the cover 72 which is peripherally and resiliently sealed to the housing 70 by the flex ring 73. Thus the cover 72 is axially moveable in the manner of a diaphragm reducing or increasing the space in the cavity 74 where the rotor or disc 67 moves. An outer cushion membrane 75 is peripherally sealed to the outer case 70 and may be filled with a gas or liquid. As force is applied externally of the membrane 75 or as pressure is increased in the space 76 intermediate the membrane and cover 72 the cover moves inwardly applying pressure to or compacting fluid powder material filling the cavity 64. This increases the viscosity of the fluid powder and brakes the low inertia disc 67. On relaxation of the pressure on the cavity 74 the brake or clutch is released and the fluid powder resumes its low viscosity cloud-like condition in the cavity 64 allowing the rotor to proceed in response to drive force. By reference to FIGURE 8 it will be seen that the case 70 is eccentric in reference to the rotor or disc 67, but it may also be concentric since the entire plane surface of the disc 67 is exposed to friction drag. The desirability of the eccentric form is to achieve a suitable rapid pumping action of the fluid powder assisted by the radial slots 69. While the structure is described generally as a brake it will also be appreciated that the device will also serve as a clutch structure. While the annular electromagnetic rings are shown on only one side of the rotor structure the invention goes to use on either side or both sides of the rotor as is required by particular applications of the devices.

The powder used is comprised of discrete particles below 200 mesh and extending into the micron range. To the powder is added a small percentage, between about one half of one percent and about two percent of abrasive particles such as silicon dioxide, Carborundum or the like in the particle size range indicated. This assists in avoidance of glazing of the friction surfaces thereby maintaining high torque performance.

In the magnetic versions the dry fluid powder is a mixture of about twenty percent Carbonyl E and about eighty percent Plastiron to which the small percentage of abrasive material is added. In general, specific mixes from the above proportions have been found desirable for particular applications. Other magnetic particle materials such as the ferromagnetic compounds in powder form and below the 300 mesh size are also useful. Proper graded mixes result in increased powder permeability and best performance at the particle boundaries. The result is higher overall torque and increased torque stability. An excellent powder for magnetic application is 410 stainless steel powder containing prealloyed aluminum with the indicated percentage of abrasive material.

The powder cavity in the devices described should be several times the volume of the gap between the friction surfaces. This extends the life of the powder and generally lowers the operating temperatures. Temperature should be held to not exceed 500 to 600 degrees Fahrenheit in the powder cavity. Higher temperatures tend to oxidize the powder and reduce torque.

The thickness of the drive disc or rotor should be compatible with the inertia required as well as stiffness under the torque which is to be transmitted. The material of the disc or rotor is variable but in the magnetic version of the clutch-brake should be magnetic and possess low reluctance characteristics. Structural stiffness must be compatible with magnetic forces forcing the disc against poles. The slotting of the disc should be adequate to allow constant penetration of the fluid powder cloud to the gap between rotor and friction surface. The working gap between the working face of the rotor and friction surface of the case or magnets (as the case may be) can be varied between about .010 and about .030 inch. Variance of the gap alters the torque characteristics of the brake or clutch more or less linearly.

Where stationary coils are used as for example in FIGURES 3, 4 and 6 the gap should be maintained as small as possible to reduce reluctance at the air gaps. With actual magnetic powder this will show a permeability of about 40 to 50 percent of the solid material at high flux levels depending on powder characteristics. As previously indicated, a radial brake in the circular core case upgrades magnet response time.

In operation in precision braking and clutching situations as in computer tape control mechanisms the devices herein described have proved unusually accurate and operate with a torque decay far below the rate experienced with prior brake and clutch devices.

Having thus described my invention it will be appreciated by those skilled in the art that a wide variety of modifications, changes, improvements and applications are possible and such modifications, changes, improvements, and applications are intended to be included herein limited only by the scope of the hereinafter appended claims.

I claim:
1. A fluid particle coupling such as a brake or clutch comprising:
    (a) a thin flat circular disc;
    (b) a shaft extending normal to said disc and from the center of said disc;
    (c) a magnet ring eccentric about said shaft and the pole faces of said magnet ring being parallel to said disc in spaced parallel plane relation thereto and within the peripheral extent of said disc;
    (d) an electric coil in said ring;
    (e) a housing concentric about the axis of said shaft supporting said shaft and enclosing said disc and said magnet ring and defining with said magnet ring a cavity about said disc;
    (f) a particulated magnetic fluid material in said cavity so defined by said enclosure and said magnetic ring; and
    (g) means to selectively energize said coil.
2. In the structure as set forth in claim 1 wherein said particulated solid fluid material includes both magnetic and abrasive materials.
3. A magnetic dry powder type clutch comprising:
    (a) a magnet ring the pole pieces of which comprise at least two concentric land surfaces in a single plane and having a coil therebetween;
    (b) a low inertia thin disc in spaced relation and parallel to the plane of said pole pieces of said magnet the outer periphery of said disc extending at least to the outer periphery of said magnet ring;
    (c) a shaft driveably secured axially to said disc, the axis of said shaft being parallel to and offset from the axis of said magnet ring;
    (d) a housing about said disc and said magnet ring and supporting said shaft and said magnet ring and defining a powder cavity in which said disc is positioned; and
    (e) a magnetic powder including an abrasive additive loosely filling said cavity and having a low viscosity characteristic until influenced by energization of said magnet ring and thereupon increasing in viscosity and imposing frictional drag between said lands of said magnet and the plane surface of said disc.
4. A fluid particle coupling such as a brake or clutch comprising:
    (a) a thin flat circular disc;
    (b) a shaft extending normal to said disc and from the center of said disc;
    (c) a plurality of concentrically positioned magnet rings in eccentric relation to said disc and the pole faces of said magnet rings being parallel to said disc in spaced parallel plane relation thereto;
    (d) an electric coil in said rings;
    (e) a housing supporting said shaft and enclosing said disc and said magnet rings and defining with said magnet rings a cavity about said disc;
    (f) a particulated magnetic fluid material in said cavity so defined by said enclosure and said magnetic rings; and
    (g) means to selectively energize said coils.

References Cited by the Examiner
UNITED STATES PATENTS

| | | | |
|---|---|---|---|
| 2,813,605 | 11/1957 | Buslik et al. | 192—21.5 |
| 2,897,931 | 8/1959 | Didszuns | 192—215 |
| 2,900,343 | 8/1959 | Barns et al. | 252—62.5 |
| 2,987,153 | 6/1961 | Perry | 192—21.5 |
| 3,026,978 | 3/1962 | Canard | 192—21.5 |
| 3,047,507 | 7/1962 | Winslow | 252—75 |
| 3,074,523 | 1/1963 | Yeiser | 192—21.5 |
| 3,141,708 | 7/1964 | Evangelista | 308—36.1 |
| 3,179,476 | 4/1965 | Hurwitt | 308—36.1 |

FOREIGN PATENTS

| | | |
|---|---|---|
| 1,249,263 | 11/1960 | France. |
| 758,621 | 10/1956 | Great Britain. |
| 249,295 | 4/1948 | Switzerland. |

DAVID J. WILLIAMOWSKY, *Primary Examiner.*